United States Patent
Javelot et al.

(10) Patent No.: US 9,470,604 B2
(45) Date of Patent: Oct. 18, 2016

(54) MONITORING THE FUEL SUPPLY CUTOFF VALVE FOR AN ENGINE

(71) Applicant: SNECMA, Paris (FR)

(72) Inventors: Christophe Javelot, Rungis (FR); Mohamed Boutaleb, Paris (FR); Cedrik Djelassi, Marolles en Hurepoix (FR); Victor Henry, Paris (FR)

(73) Assignee: SNECMA, Paris (FR)

( * ) Notice: Subject to any disclaimer, the term of this patent is extended or adjusted under 35 U.S.C. 154(b) by 212 days.

(21) Appl. No.: 14/299,392

(22) Filed: Jun. 9, 2014

(65) Prior Publication Data

US 2014/0360255 A1    Dec. 11, 2014

(30) Foreign Application Priority Data

Jun. 10, 2013 (FR) ..................... 13 55317

(51) Int. Cl.
| | | |
|---|---|---|
| G01M 15/00 | (2006.01) |
| G01M 15/04 | (2006.01) |
| F01D 21/20 | (2006.01) |
| F02C 7/232 | (2006.01) |
| F02C 9/46 | (2006.01) |

(52) U.S. Cl.
CPC ............ *G01M 15/042* (2013.01); *F01D 21/20* (2013.01); *F02C 7/232* (2013.01); *F02C 9/46* (2013.01); *F05D 2260/83* (2013.01); *Y02T 50/671* (2013.01)

(58) Field of Classification Search
CPC .... G01M 15/00; G01M 15/042; F02C 7/232
USPC ............... 73/114.38, 114.42, 114.43, 114.45, 73/114.48, 114.52
See application file for complete search history.

(56) References Cited

U.S. PATENT DOCUMENTS

| | | | | |
|---|---|---|---|---|
| 6,089,080 A * | 7/2000 | Takaku | ............... | F02M 25/0809 123/520 |
| 6,367,458 B1 * | 4/2002 | Furusho | ............. | F02M 25/0809 123/198 D |
| 8,925,329 B2 * | 1/2015 | Godel | ................... | F01D 21/003 60/778 |

(Continued)

FOREIGN PATENT DOCUMENTS

| | | |
|---|---|---|
| DE | 1 551 205 A1 | 1/1970 |
| GB | 2 125 185 A | 2/1984 |
| JP | 2012-145034 A | 8/2012 |

OTHER PUBLICATIONS

U.S. Appl. No. 14/409,091, filed Dec. 18, 2014, Cabret, et al.

(Continued)

*Primary Examiner* — Eric S McCall
(74) *Attorney, Agent, or Firm* — Oblon, McClelland, Maier & Neustadt, L.L.P.

(57) ABSTRACT

A method of testing an engine fuel supply cutoff valve includes: detecting a fuel supply cutoff command; commanding to close the fuel supply cutoff valve; commanding to hold the fuel metering valve in the open position for a predetermined time; commanding to close the fuel metering valve after the predetermined time; measuring an engine operating parameter during performance of the previous steps; and comparing the measured parameter with a predetermined threshold, so as to determine whether or not the engine operating parameter corresponds to an engine fuel supply cutoff by normal operation of the fuel supply cutoff valve.

10 Claims, 4 Drawing Sheets

(56) References Cited

U.S. PATENT DOCUMENTS

2009/0007641 A1* 1/2009 Haag .................. G01M 3/32
                                                                                        73/49.7

2012/0272710 A1* 11/2012 Godel .................. F02C 9/28
                                                                                        73/1.16

OTHER PUBLICATIONS

French Search Report issued Mar. 6, 2014 in French Patent Application No. 1355317 (with English Translation of Category Documents).

* cited by examiner

MONITORING THE FUEL SUPPLY CUTOFF VALVE FOR AN ENGINE

TECHNICAL DOMAIN

This invention relates to monitoring of the fuel supply cutoff valve for an engine.

The function of the fuel supply cutoff valve is to enable or disable fuel from being injected into the combustion chamber through the engine injection line.

When the valve is open, fuel is injected into the combustion chamber after having been measured by a metering valve. When the valve is closed, fuel cannot be injected and the engine stops or does not start.

STATE OF PRIOR ART

It is known that a fuel supply cutoff valve can be monitored by means of a position sensor to determine the position and therefore the open or closed state of the valve.

It is desirable to eliminate this position sensor in order to reduce the cost and weight of the engine. Nevertheless, the fuel supply cutoff valve needs to be monitored reliably, to check correct operation of the valve and particularly to make sure that the valve effectively cuts off the engine, to prevent any dormant failure.

PRESENTATION OF THE INVENTION

The invention is aimed at solving problems according to prior art by providing a method of testing an engine fuel supply cutoff valve, characterised in that it comprises steps to:

detect a fuel supply cutoff command;

command to close the fuel supply cutoff valve;

command to hold the fuel metering valve in the open position for a predetermined time;

command to close the fuel metering valve after the predetermined time;

measure an engine operating parameter during performance of the previous steps;

compare the measured parameter with a predetermined threshold, so as to determine whether or not the engine operating parameter corresponds to an engine fuel supply cutoff by normal operation of the fuel supply cutoff valve.

With the invention, it is possible to detect if the fuel supply cutoff valve is blocked in the open position, without using a position sensor. The result of the comparison can quickly and reliably discriminate between nominal operating cases and valve blocked cases.

The position sensor is no longer necessary, therefore there is no need to include it in the fuel circuit, which reduces its cost.

It should be noted that the invention is equally applicable to a case in which the command to close the fuel supply cutoff valve inherently causes closure of the fuel metering valve and to a case in which this command does not close the fuel metering valve. In the second case, the invention can also stop the engine by closing the metering valve, if the fuel supply cutoff valve is blocked in the open position.

If fuel supply cutoff the valve should fail, the command to close the fuel metering valve after the predetermined time effectively closes the fuel supply due to the fuel metering valve.

According to one preferred characteristic, the engine operating parameter is an engine speed gradient.

According to an alternative preferred characteristic, the engine operating parameter is a pressure gradient.

These parameters can be measured easily and with sufficient precision to provide reliable results.

According to one preferred characteristic, the test method also includes a preliminary step to check that safety conditions are satisfied. This assures that the test will be performed under optimum conditions for engine operation.

According to a preferred characteristic, in the case of an aircraft engine, safety conditions include detection that the aircraft is on the ground.

According to a preferred characteristic, the test method also includes a preliminary step to check that the test validity conditions are satisfied. Thus, the test results are reliable, repeatable and comparable between one test and another.

According to a preferred characteristic, the test validity conditions include the verification that the engine speed is above a predetermined threshold.

The invention also relates to a device to test an engine fuel supply cutoff valve, characterised in that it includes:

means of detecting a fuel supply cutoff command;

means of giving a command to close the fuel supply cutoff valve;

means of giving a command to hold the fuel metering valve in the open position for a predetermined time;

means of giving a command to close the fuel metering valve after the predetermined time, means of measuring an engine operating parameter during performance of the previous steps;

means of comparing the measured parameter with a predetermined threshold so as to determine whether or not the engine operating parameter corresponds to an engine fuel supply cutoff due to normal operation of the fuel supply cutoff valve.

The device according to the invention has advantages similar to those disclosed above.

In one particular embodiment, steps in the method according to the invention are performed by computer program instructions.

Consequently, the invention also aims at a computer program on an information medium, this program being useable in a computer, this program containing instructions suitable for performance of the steps in a method like that described above.

This program can use any programming language, and may be in the form of source code, object code, or code intermediate between source code and object code such as a partially compiled form, or in any other desirable form.

The invention also relates to an information medium that can be read by a computer, and that contains computer program instructions suitable for performing steps in a method like that described above.

The information medium may be any entity or device capable of storing the program. For example, the medium may comprise a storage means such as a ROM, for example a CD ROM or a microelectronic circuit ROM, or even a magnetic recording means, for example a diskette or a hard disk.

Furthermore, the information medium may be a transmittable medium such as an electric or optical signal that can be transported by an electric or optical cable, by radio or by other means. In particular, the program according to the invention can be downloaded from an internet type network.

Alternately, the information medium may be an integrated circuit in which the program is integrated, the circuit being suitable for running the program or for being used for execution of the method according to the invention.

BRIEF DESCRIPTION OF THE DRAWINGS

Other characteristics and advantages will become clear after reading a preferred embodiment given as a non-limitative example, described with reference to the figures in which.

DETAILED PRESENTATION OF PARTICULAR EMBODIMENTS

Figure 1:
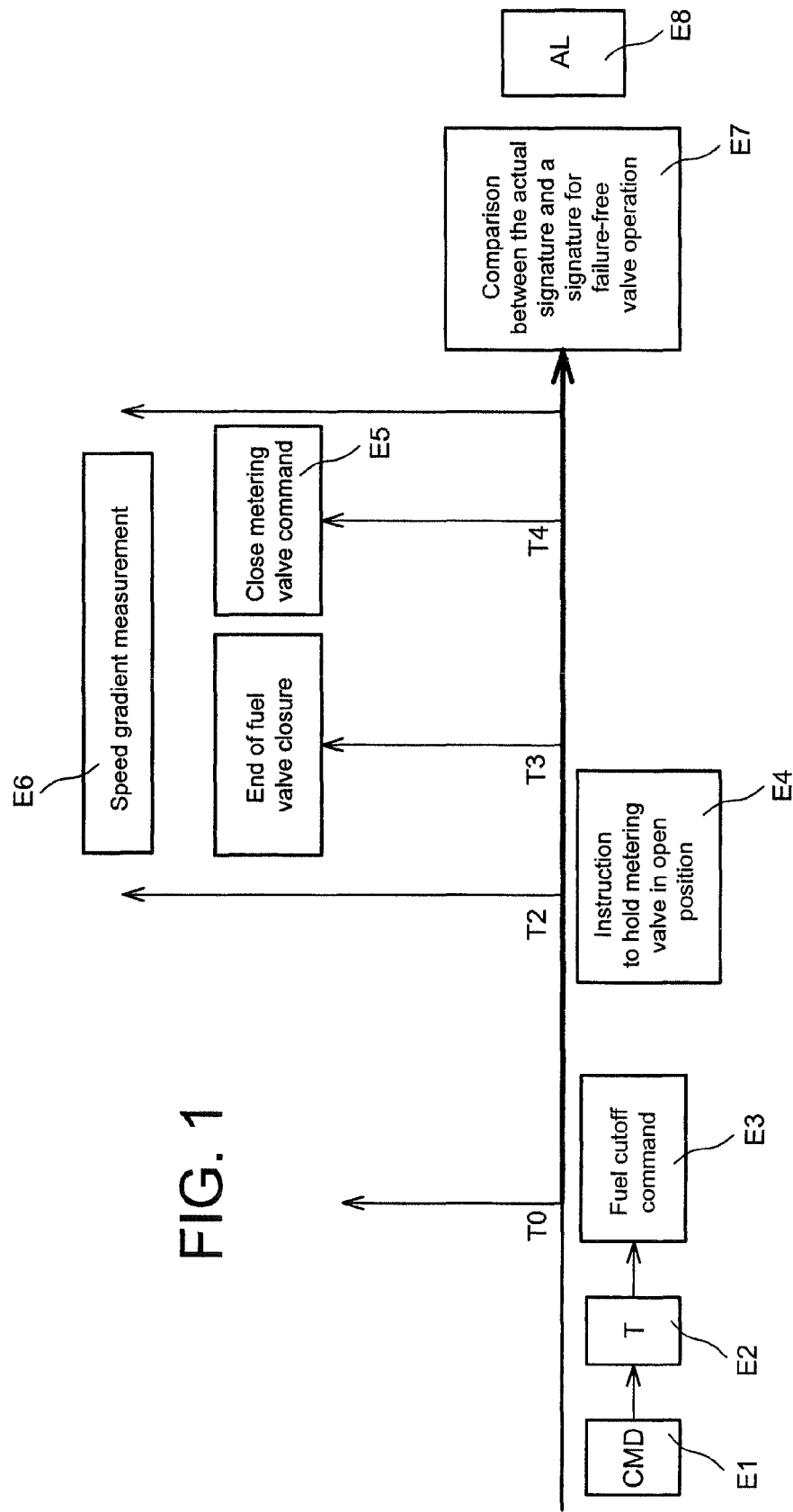
FIG. 1 shows the test method for an engine fuel supply cutoff valve according to the invention.

According to one preferred embodiment of the invention shown with reference to FIG. 1, the test method comprises steps E1 to E8. A time axis has been plotted, and times T0 to T4 have been marked on this axis; the meanings of T0 to T4 will be explained later.

Step E1 is detection of an engine fuel supply cutoff command CMD. This command is given by an operator. The invention is applicable to all types of engines supplied by fuel. The case of an aircraft will be considered throughout the remaining description, and in this case the pilot will typically give the engine fuel supply cutoff command.

The next step E2 is a test to determine if preliminary test safety and validity conditions are satisfied.

For example, one safety condition is that the aircraft should be on the ground. This condition, combined with the fact that the test is only started following detection of an engine fuel supply cutoff command made by the pilot (step E1), guarantees that cutoffs will be performed correctly in flight or during a computer protective cutoff, for example in the case of overspeed.

These cutoffs in flight are necessary for correct operation of the engine throughout the flight. They are only efficient if they are done quickly, therefore by closing the fuel supply cutoff valve and the fuel metering valve. If the metering valve were kept open during cutoffs in flight as is the case with the invention, there would be a risk of damaging the engine, for example by engine overheating.

For example one test validity condition is that the engine speed is above a predetermined threshold. The gradient of the engine speed depends on the engine speed. For example, if the pilot decides to cutoff the fuel supply before the engine has reached its idle speed, the gradient of the engine speed may be similar to the gradient that would occur during incorrect operation of the engine fuel supply closing valve, which would cause a false failure detection. Therefore, the validity condition makes the test more reliable.

The purpose of step E2 is to activate the test only in a nominal cutoff case, in other words a cutoff requested by the pilot, with the engine running at idle speed. This firstly results in repeatable conditions and therefore comparable situations, which firstly avoids making the results dependent on the engine speed, and secondly avoids any unwanted activation of the test.

The next step E3 is the command to close the fuel supply cutoff valve. This command occurs at time t=T0.

In a first case, the command to close the fuel supply cutoff valve resets the computer.

This reset may for example last for 260 ms, namely between time T0 and time T2. During this reset, a zero current called the closing current, is sent to the fuel metering valve. The fuel metering valve then begins closing, in other words it begins to close slowly. This closing of the fuel metering valve for 260 ms reduces the fuel supply by a limited amount. The inventors have experimentally demonstrated that its influence on the drop in engine speed is negligible. Therefore, closing of the fuel metering valve has no influence on the reliability of the test.

When the reset is terminated at time T2, the next step E4 is to issue to command to hold the fuel metering valve in the open position for a predetermined time, for example 2 seconds. Therefore, the fuel metering valve is held in the position that it reached at the end of the reset, in other words open.

In a second case, the command to close the fuel supply cutoff valve does not cause a reset of the computer. In this case, time T2 is then practically coincident with time T0.

Step E4 is then performed immediately after step E3. Once again, this step is the command to hold the fuel metering valve in the open position for a predetermined time, for example 2 seconds.

After step E3, the fuel supply cutoff valve finishes closing at time T3 for example equal to 660 ms, if it is operating correctly.

At the end of the predetermined time, namely at time T4, the next step E5 is the command to close the metering valve.

In practice, the fuel supply cutoff command may also involve closing of a fuel stop valve. This valve closes slowly, for example in 2 seconds. Therefore the command to close the metering valve is given shortly before the fuel stop valve is closed, or at the same time. Thus, it is guaranteed that the engine will stop.

During steps E3 to E5, and more particularly between at least times T2 and T4, a step E6 is performed to measure an engine operating parameter. In a preferred embodiment, the measured parameter is the gradient of the engine speed. As a variant, the measured parameter is a pressure gradient. The measurements form a signature of operation of the fuel supply cutoff valve.

Step E7 is a real time comparison of measurements made with a predetermined threshold so as to determine whether or not the gradient of the engine speed corresponds to a cutoff of the fuel supply to the engine by normal operation of the fuel supply cutoff valve, in other words its actual closure. The threshold is chosen to correspond to a maximum value of the gradient in the case in which the fuel supply cutoff valve is not closed.

If the engine speed gradient crosses the predetermined threshold, then the fuel supply cutoff valve is operating correctly.

If the engine fuel supply cutoff valve does not close, then the valve is not operating correctly; step E7 is then followed by step E8 in which an alarm AL is generated.

Figure 2A:
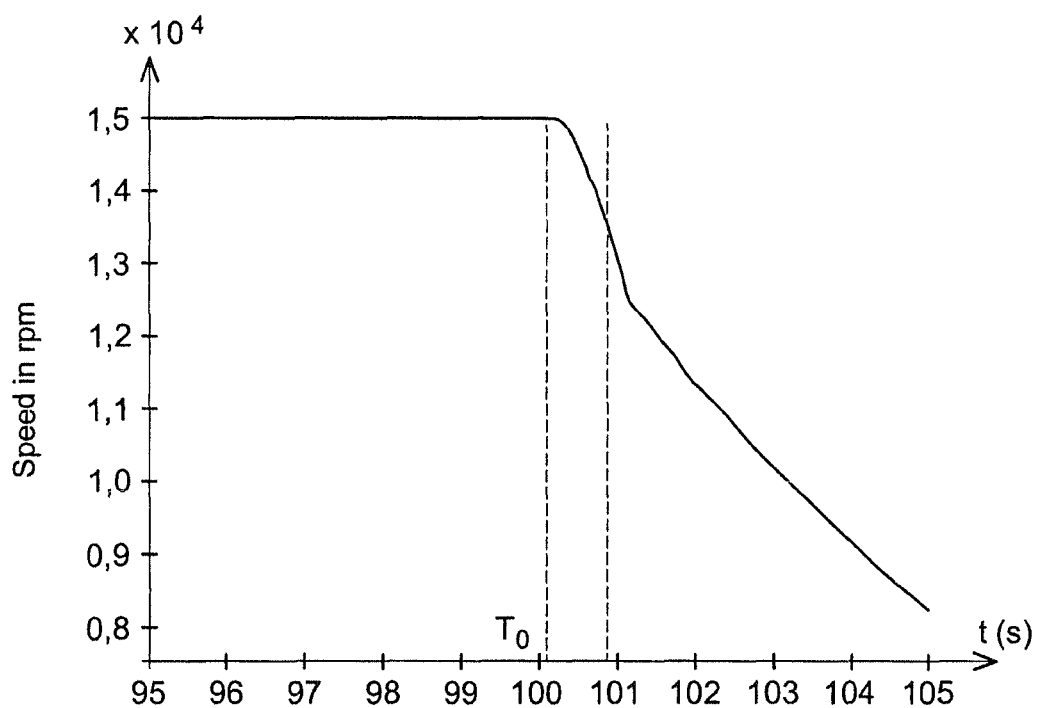
FIG. 2a shows the engine speed N2 as a function of time, when the fuel supply cutoff valve is operating correctly.
Figure 2B:
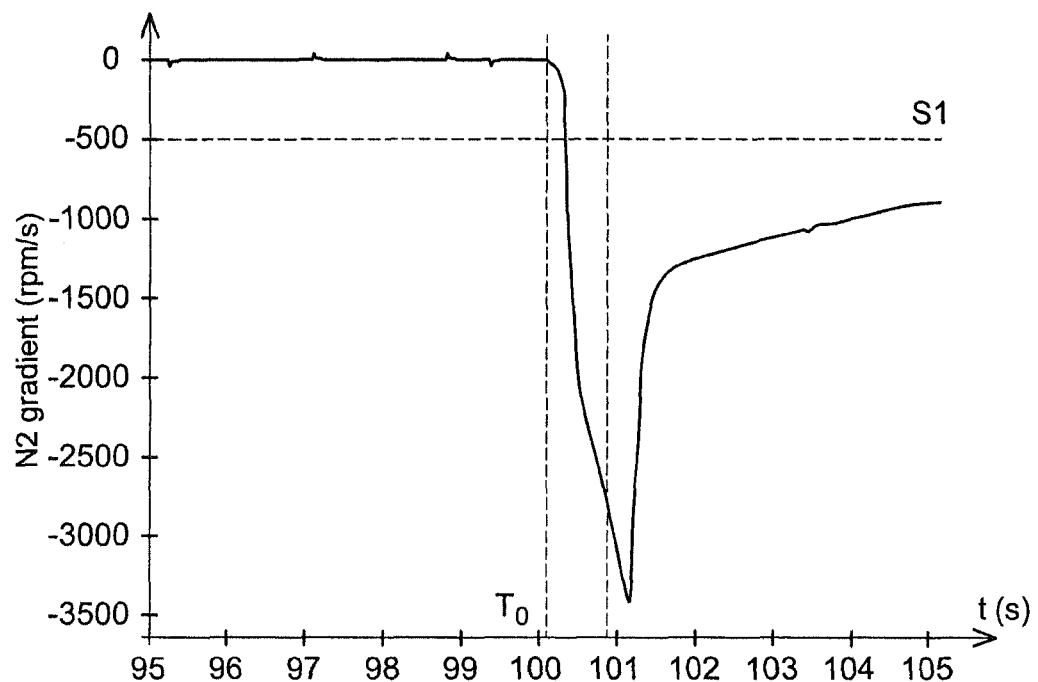
FIG. 2b shows the gradient of the engine speed N2 as a function of time, when the fuel supply cutoff valve is operating correctly.

FIGS. 2a and 2b show the case in which the fuel supply cutoff valve is operating correctly, and it closes in response to a close command.

FIG. 2a shows the engine speed N2 expressed in rpm as a function of time, and FIG. 2b shows the gradient of the engine speed N2 expressed in rpm/s as a function of time.

The close command is given at time t equal to 100 seconds. Before this time, the engine speed is constant and the gradient is zero. Starting from time t, the engine speed reduces and the engine speed gradient also reduces.

Figure 3A:
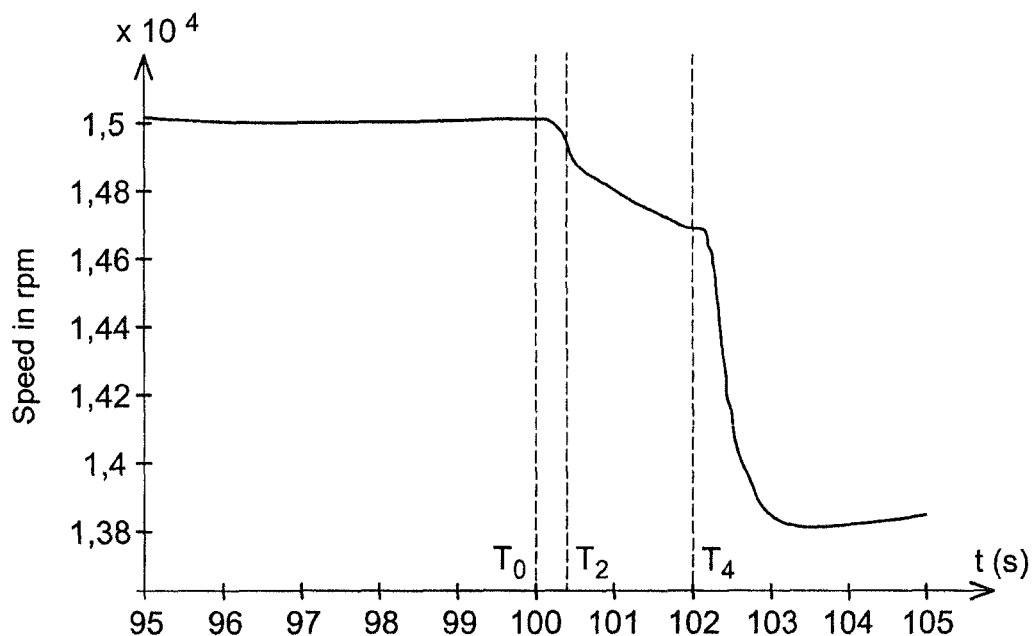
FIG. 3a shows the engine speed N2 as a function of time, when the fuel supply cutoff valve is not operating correctly.
Figure 3B:
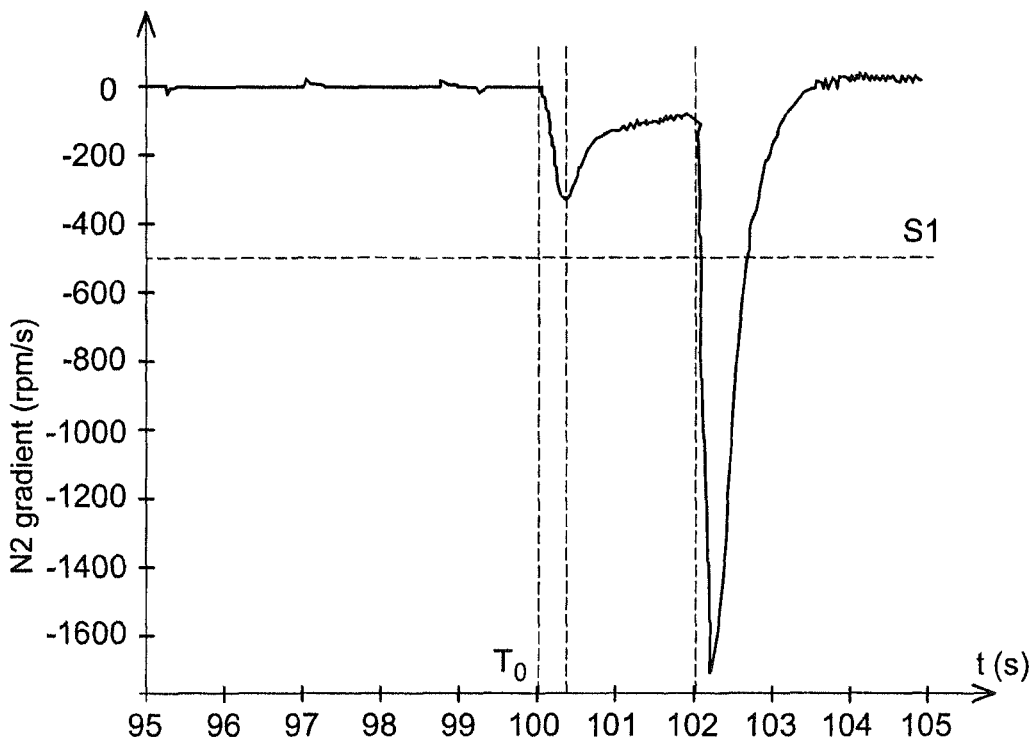
FIG. 3b shows the gradient of the engine speed N2 as a function of time, when the fuel supply cutoff valve is not operating correctly.

FIGS. 2a and 2b should be compared with FIGS. 3a and 3b respectively, that correspond to the case in which the fuel supply cutoff valve does not operate correctly and does not close in response to the close command.

FIG. 3a shows the engine speed N2 expressed in rpm as a function of time, and FIG. 3b shows the gradient of the engine speed N2 expressed in rpm/s as a function of time.

The close command occurs at time t equal to 100 seconds. Before this time, the engine speed is constant and the gradient is zero. Starting from time t, the engine speed reduces and the gradient of the engine speed also reduces.

However, unlike in FIGS. 2a and 2b, it can be seen that the engine speed reduces slowly during forced opening of the fuel metering valve, unlike the case in which the engine fuel supply cutoff valve is functioning.

In particular, a comparison of engine speed gradients between times 100 s and 102 s (corresponding to times T0 and T4 respectively), in the case of nominal operation (FIG. 2b) and the case of a failure of the fuel supply cutoff valve (FIG. 3b), shows a threshold S1 equal to approximately −500 rpm/s.

In FIG. 2b and therefore in the case of nominal operation, the engine speed gradient is much less than the threshold S1, or its absolute value is greater.

On the other hand in FIG. 3b, the engine speed gradient does not cross the threshold S1 before the fuel metering valve close command has been given. The engine speed gradient remains greater than the threshold S1, or its absolute value is less. This illustrates a failure of the fuel supply cutoff valve.

Figure 4:
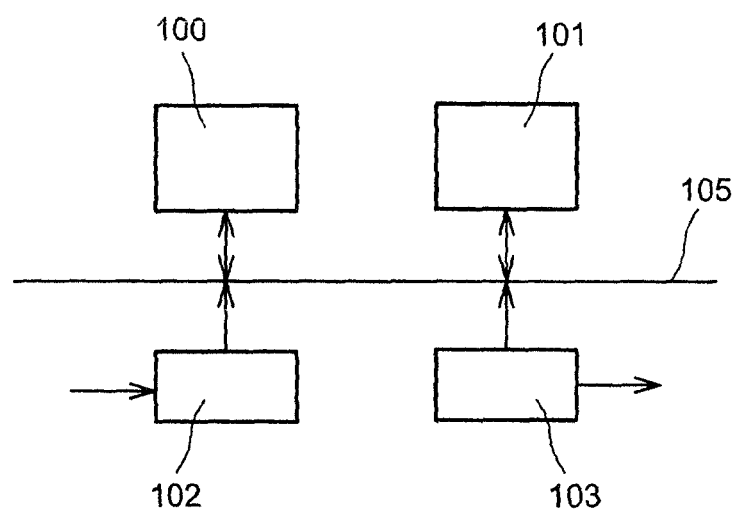
FIG. 4 shows an embodiment of the test device for an engine fuel supply cutoff valve, according to the invention.

FIG. 4 shows a particular embodiment of the test device according to the invention for an engine fuel supply cutoff valve.

The test device of an engine fuel supply cutoff valve comprises:
  means of detecting a fuel supply cutoff command;
  means of giving a command to close the fuel supply cutoff valve;
  means of giving a command to hold the fuel metering valve in the open position for a predetermined time;
  means of giving a command to close the fuel metering valve after the predetermined time;
  means of measuring an engine operating parameter throughout performance of the previous steps;
  means of comparing the measured parameter with a predetermined threshold, so as to determine whether or not the engine operating parameter corresponds to an engine fuel supply cutoff by normal operation of the fuel supply cutoff valve.

The test device of an engine fuel supply cutoff valve is structured like a computer. In particular, it comprises a processor 100 running a computer program using the method according to the invention, a memory 101, an input interface 102 and an output interface 103.

These various elements are usually connected by a bus 105.

The input interface 102 is connected to the engine and will receive the information necessary for the valve test.

The processor 100 runs the previous disclosed processing. This processing is done in the form of coding instructions in the computer program that are stored in the memory 101 before being executed by the processor 100.

The memory 101 also stores the measured values of the engine speed gradient.

The output interface 103 is connected to the engine to send the commands required to test the valve to it. It is also connected to an interface that sends an alarm generated following incorrect operation of the valve, to an operator.

The invention claimed is:

1. A method of testing a fuel supply cutoff valve in a fuel circuit for supplying fuel to an aircraft engine, said fuel circuit further comprising a fuel metering valve having an open position and a closed position in order to meter fuel being injected into a combustion chamber of the engine, said method comprising:
  detecting a fuel supply cutoff command;
  commanding to close the fuel supply cutoff valve;
  commanding to hold the fuel metering valve in the open position for a predetermined time;
  commanding to close the fuel metering valve after the predetermined time;
  measuring an engine operating parameter while the commanding to close the fuel supply cutoff valve, the commanding to hold the fuel metering valve in the open position for the predetermined time, and the commanding to close the fuel metering valve after the predetermined time are carried out; and
  comparing the measured engine operating parameter with a predetermined threshold, so as to determine whether or not the engine operating parameter corresponds to an engine fuel supply cutoff by normal operation of the fuel supply cutoff valve.

2. A testing method according to claim 1, wherein the engine operating parameter is an engine speed gradient.

3. The testing method according to claim 1, wherein the engine operating parameter is a pressure gradient.

4. A non-transitory computer readable recording medium including computer executable instructions for executing the method according to claim 1.

5. A testing method according to claim 1, wherein the predetermined threshold corresponds to a maximum value in a case in which the fuel supply cutoff valve is not closed.

6. The testing method according to claim 1, further comprising a preliminary step of checking that prerequisites are verified.

7. The testing method according to claim 6, wherein the engine is an aircraft engine, and said prerequisites include detection that the aircraft is on the ground.

8. The testing method according to claim 1, further comprising a preliminary step of checking that validity conditions are satisfied.

9. The testing method according to claim 8, wherein the validity conditions include verification that the engine speed is above a predetermined threshold.

10. A device to test an engine fuel supply cutoff valve in a fuel circuit for supplying fuel to an aircraft engine, said fuel circuit further comprising a fuel metering valve having an open position and a closed position in order to meter fuel being injected into a combustion chamber of the engine, said device comprising:
  means of detecting a fuel supply cutoff command;
  means of giving a command to close the fuel supply cutoff valve;
  means of giving a command to hold the fuel metering valve in the open position for a predetermined time;
  means of giving a command to close the fuel metering valve after the predetermined time;
  means of measuring an engine operating parameter while the command to close the fuel supply cutoff valve, the command to hold the fuel metering valve in the open position for the predetermined time, and the command to close the fuel metering valve after the predetermined time are carried out and means of comparing the measured engine operating parameter with a predetermined threshold so as to determine whether or not the engine operating parameter corresponds to an engine fuel supply cutoff due to normal operation of the fuel supply cutoff valve.

\* \* \* \* \*